United States Patent Office 3,323,838
Patented June 6, 1967

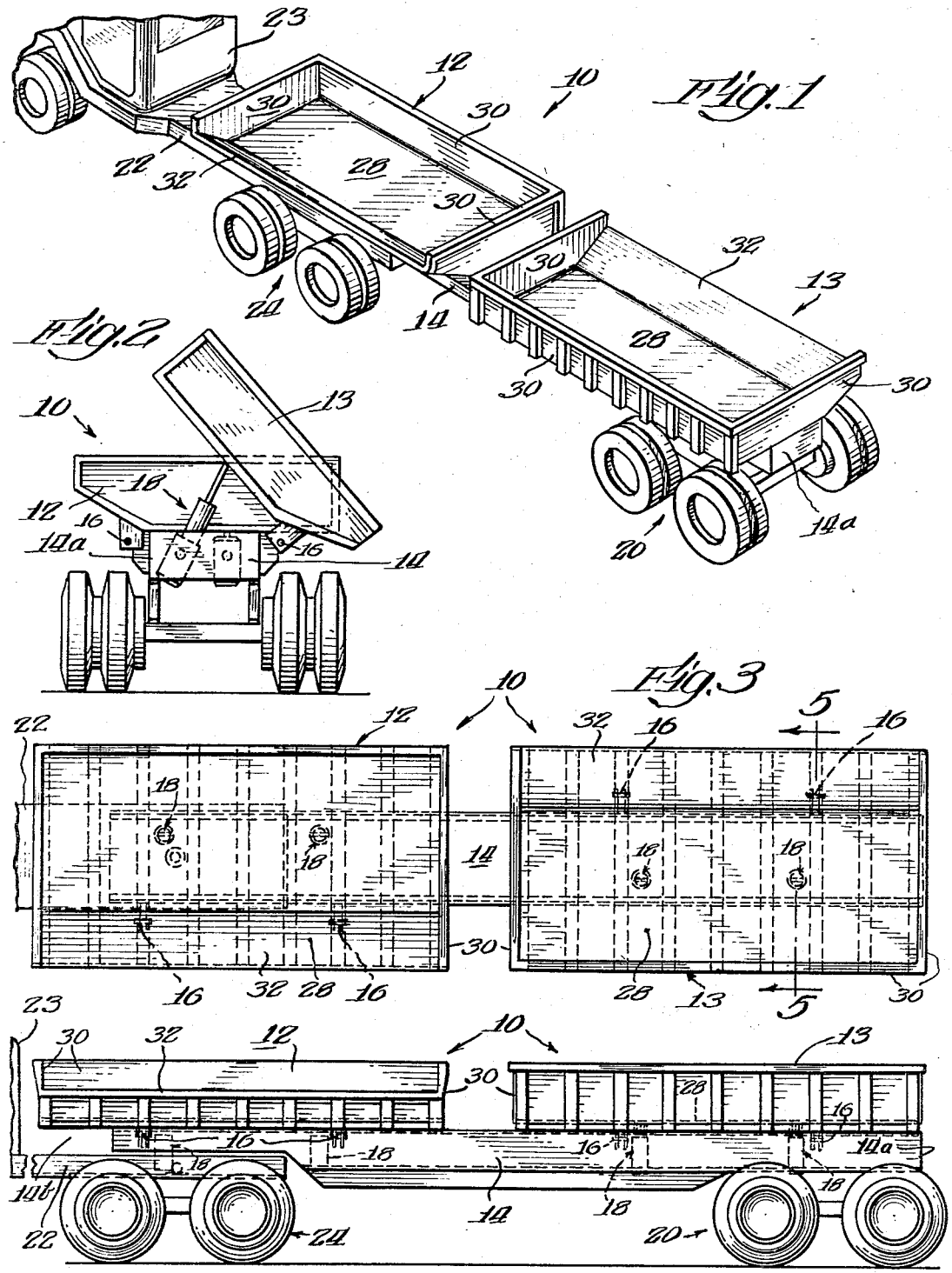

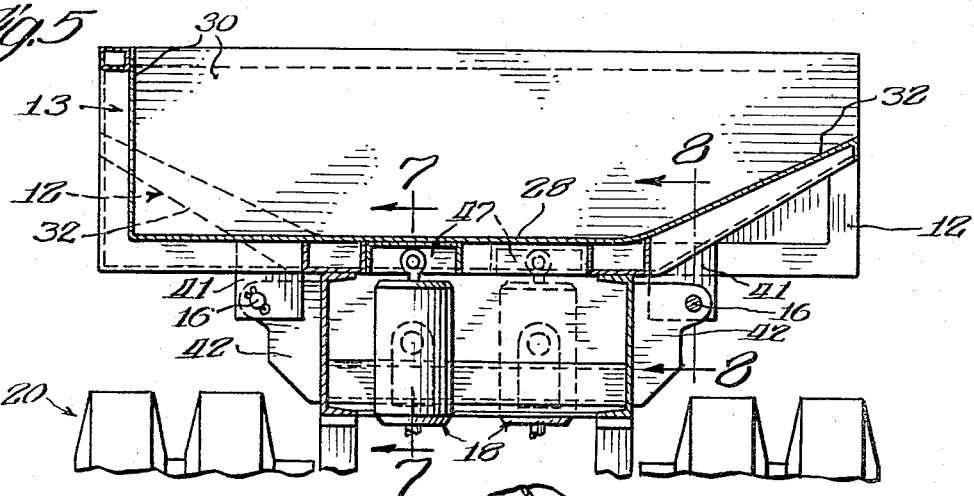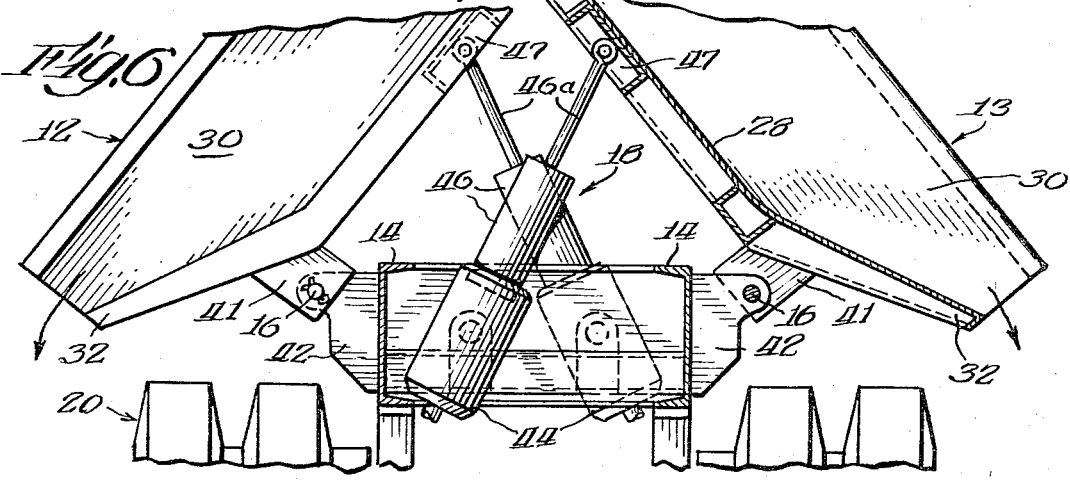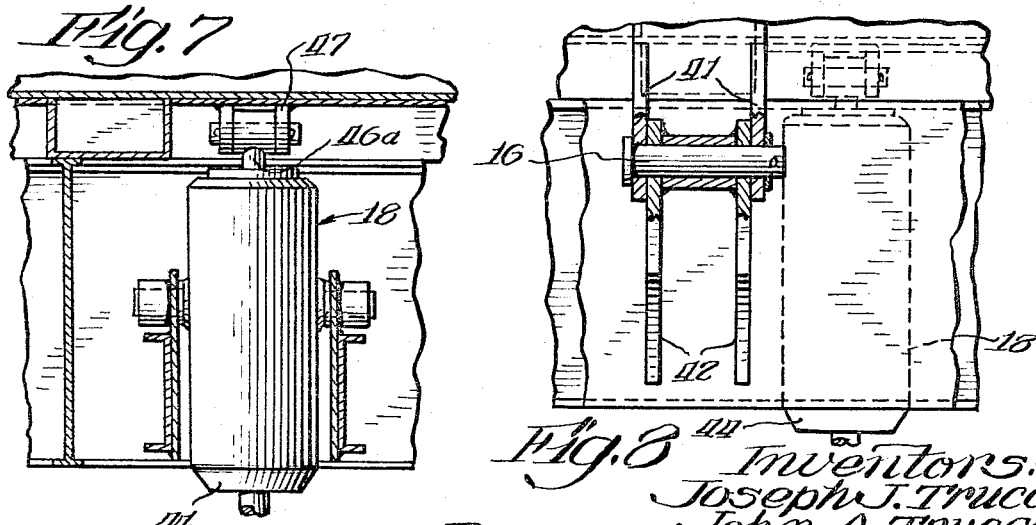

3,323,838
DUMP VEHICLE HAVING PLURAL OPPOSITE
SIDE DUMPING RECEPTACLES
Joseph J. Trucco, 440 Atwater St., and John A. Trucco,
286 Boyd St., both of Elmhurst, Ill. 60126; Ann K.
Trucco, administrator of said Joseph J. Trucco, deceased
Filed Mar. 17, 1965, Ser. No. 440,457
1 Claim. (Cl. 298—8)

This invention relates to improvements in dumping trailers for load carrying vehicles.

Modern construction operations demand efficient means for rapidly and safely transporting and unloading heavy material loads. Multi-wheeled tractor-trailer combinations are prime material movers in such operations. However, various vehicle, highway and bridge law restrictions and other safety considerations have in general limited the load carrying capacities of such vehicles. In this connection, statutory limitations on the load weight that can be transported by a given wheel base have necessitated the use of dumping trailers of increased length.

However, conventional dumping trailers of substantial length have proven to be both hazardous and inconvenient to dump due to the great height to which the dumping body must be raised to achieve the necessary dumping angle and effect the discharge of the load. When conventional rear dumping trailers of substantial length are raised in the dumping position there is a likelihood of tipping. This tipping can occur when the trailer is being operated on terrain that is not level or is unfirm, when a rear tire is caused to blow by the redistribution of the load weight during dumping, when high winds or wind gusts are encountered, when tail gate malfunctions occur, and for other reasons.

It is an object of the present invention to provide a dumping trailer having improved loading, load carrying, and dumping characteristics.

Another object of the invention is to provide a dumping trailer having a large load carrying capacity, while at the same time providing a balanced weight distribution that satisfies highway and bridge law restrictions.

It is another object of the invention to provide a dumping trailer having a pair of coacting dump bodies, each with a center of gravity such that the load may be dumped while the truck is in motion and/or when the truck is operating on unfirm and/or uneven terrain.

A more specific object of the invention is to provide a dual body dumping trailer that can be readily drawn by a conventional truck tractor or similar vehicle and which includes low cost, reliable and efficient means for effecting the simultaneous dumping actuation of the dual bodies.

Other objects and advantages of the present invention will become apparent from the following detailed description of one preferred embodiment thereof particularly when considered in conjunction with the accompanying drawings, wherein:

FIGURE 1 is a perspective view of a dual body dumping trailer constructed in accordance with the present invention and illustrating the trailer when secured to a conventional truck tractor;

FIGURE 2 is a rear view of the trailer shown in FIG. 1, but with one of the dump bodies in an actuated position;

FIGURE 3 is a plan view of the dumping trailer;

FIGURE 4 is a side elevational view of the dumping trailer;

FIGURE 5 is an enlarged cross-sectional view taken generally along the line 5—5 in FIG. 3;

FIGURE 6 is a view similar to FIG. 5, but depicting the dual dump bodies of the trailer in an actuated position;

FIGURE 7 is an enlarged, fragmentary cross-sectional view taken generally along the line 7—7 in FIG. 5; and FIGURE 8 is an enlarged fragmentary cross-sectional view taken generally along the line 8—8 in FIG. 5.

In general, the present invention is directed to an improved dumping trailer construction having a large load carrying capacity distributed over a substantial wheel base dimension. Preferably, the dumping trailer employs a pair of load carrying dump bodies that are mounted in longitudinal alignment on an elongated chassis. The dual dump bodies are preferably hingedly secured to the chassis so that force applying hoist means, which are joined to both the chassis and dual bodies, can effect the simultaneous tilting of the bodies in opposite directions and the discharge of the loads therefrom. The construction of the dual bodies and the mounting of the bodies on the chassis is such that a low center of gravity is achieved and the loads confined within the dual bodies are reliably discharged from a minimum dumping height. As a result, the trailer is characterized by safe and highly stable dumping operation.

Referring more specifically to the drawings, the dumping trailer, which is generally designated by the numeral 10, includes a pair of elongated, load carrying dump bodies 12 and 13 that are mounted in longitudinal alignment on an elongated trailer chassis or framework 14. The dump bodies 12 and 13, which are depicted as having a scow-shaped cross section (FIG. 5), are secured to the chassis 14 by hinge members 16. A pair of dump body actuating hoists 18 are preferably connected between each of the dump bodies and the chassis 14. Accordingly, in response to the actuation of the hoists 18, as hereinafter fully described, the dump bodies 12 and 13 are pivoted relative to the chassis 14 and into oppositely directed dumping positions (FIG. 6).

The illustrated chassis 14 has a conventional box-girder type construction and is preferably formed with a length such that optimum load weight distribution for a selected wheel base dimension is achieved. While a wheel base dimension of 32 feet allows the legal transport of a maximum load weight consistant with most highway and bridge law statutes, it will be appreciated that the chassis 14 can be constructed to meet any specific requirements.

The rear end 14a of the chassis 14 preferably carries a conventional tandem axle 20 that is secured to the underside of the chassis by a welded construction. The front end 14b of the chassis is provided with a conventional male trailer hitch 22 that allows the chassis to be joined to and pulled by a conventional truck tractor 23 (FIGS. 1 and 4). In this connection the front end 14b of the chassis, when joined to the tractor 23, overlies the drive axle 24 of the tractor, and a major portion of the forward dump body 12 overlies the rear wheels of the tractor. Although the dual dumping body and elongated chassis construction of the trailer is unique, it will be appreciated that the dumping trailer 10 can be joined to any conventional truck tractor in a manner similar to any semi-trailer unit.

Referring to the dual dump bodies 12 and 13, these bodies are preferably of identical size and configuration, and the major dimension of each lies on the longitudinal axis of the chassis. More specifically, each dump body preferably has a scow-shaped configuration and is formed by substantially flat bottom wall 28, three enclosing vertical side walls 30, and a sloped or dumping side wall 32. The dumping side wall 32 is joined to the bottom wall 28 and to the outwardly extending edge portions of the forward and rearward side walls 30.

More specifically, the sloped or dumping side wall 32 preferably forms an enclosed obtuse angle of approximately 145° with the bottom wall 28. With this angular disposition of the wall 32, full load dumping and "cleaning" of the body results when the hoists 18 are fully extended and even though a minimum dumping height is involved. Notwithstanding, the angular disposition of the wall 32 of each dump body, it will be appreciated that the side wall portions of the bodies are in alignment (FIG. 5) when the hoists are retracted. In this connection, each of the dump bodies 12 and 13 is preferably formed with a width such that the side portions of each dump body extend equidistantly beyond the chassis 14 and terminate in alignment with the outside wheels of the vehicle as shown in FIGS. 2 and 5.

Preferably, each of the dump bodies 12 and 13 defines a relatively large surface area while the side walls are of reduced height. This construction provides speed and convenience in loading (i.e. particularly since a substantially lower loading height is involved), lower overall body weight and less horizontal shifting of the center of gravity of the dump body during discharge of the load. A large surface area and low wall construction also allows the transported load to be distributed over a greater area thereby lowering the center of gravity of the load itself. In addition, this large surface area and low depth distribution of the load minimizes load shifting stress on the trailer chassis 14 during transport and particularly when braking, accelerating and/or turning the vehicle.

The hinged mounting of the dump bodies 12 and 13 on the chassis 14 is designed to allow the simultaneous dumping of the bodies on opposite sides of the chassis. In this connection and as shown in FIG. 8, relatively large pin type hinges 16 are preferably employed to achieve the mounting of the bodies on the chassis. More specifically, a pin member 40 mates with a pair of spaced apart mounting plates 41 that extend downwardly from the dump body adjacent the line of merger between the dumping wall 32 and the bottom wall 28. This pin member 40 secures the spaced apart mounting plates 41 to a complementing hinge mounting bracket 42 that extends from the side of the chassis 14.

Preferably two such hinges 16 are provided for each dump body, with the hinges being located in suitable spaced relation to each other as shown in FIGS. 3 and 4. Further, the hinges 16 are preferably arranged so that the dump bodies 12 and 13 are fully supported by the chassis 14 when the hoists 18 are in the retracted position.

It will be noted that the hinges 16 provide an axis of rotation for each of the dump bodies which is substantially parallel to and closely spaced from one side of the chassis 14. This axis of rotation is preferably adjacent the line of merger of the dumping side wall 32 and the bottom wall 28 so that the outer edge of the dumping side wall extends beyond the outer wheels of the vehicle when the corresponding dump body is advanced into the dumping position (i.e. FIG. 6).

As outlined above, the dumping of the bodies 12 and 13 is effected by hoists 18. In this connection and as shown particularly in FIG. 7, a pair of simple, yet effective, hoists 18 are provided for each dump body, and each hoist comprises a hydraulic cylinder 44 and corresponding telescoping piston member 46. Preferably, each of the cylinders 44 is pivotally mounted in a conventional manner on a bracket arrangement provided on the chassis 14. Further, each cylinder 44 is preferably mounted in direct alignment with one of the hinges 16.

With each hoist 18, the telescoping piston member 46, which is preferably formed of plurality concentric short stroke piston elements 46a, has the free end thereof connected to a mounting bracket 47 on the underside of the bottom wall 28 adjacent the center line thereof. Because of the aligned and proximate mounting of the hinges 16 and 18, the piston elements 46a, which are preferably actuated by high pressure hydraulic fluid, operate quickly and apply a uniform dumping force to the bodies 12 and 13. It will be appreciated that the conventional hydraulic controls (not shown) feeding the hoists 18 are arranged so that the hoists are simultaneously rendered effective. Since both the hoists 18 and hinges 16 are disposed underneath the dump bodies, all pivot points and operating units are shielded from damage and/or contamination during loading, transporting and unloading.

The operation of the dumping trailer 10 will, in a conventional manner, generally be controlled remotely from the truck tractor 23. In this connection, when a loaded dumping trailer 10 has been transported to the site where the load is to be discharged, the operator actuates hydraulic controls in the tractor that cause the dual hoists 18 for each of the dump bodies 12 and 13 to be simultaneously rendered effective. In response to the actuation of the hoists, the dump bodies are pivoted on the hinge members 16 relative to the chassis 14. Because the bodies 12 and 13 are mounted so that they need be raised to only a relatively low dumping height the actuation of these dump bodies occurs rapidly and uniformly. Even though the dump bodies are advanced to what is generally considered a low dumping height, the scow-shaped construction of these dumping bodies results in the load being cleanly and rapidly discharged.

The dumping trailer 10 provides numerous advantages over conventional dump truck designs. At all times during a dumping operation the trailer and the load transported in each dump body maintain a safe, low center of gravity. In addition, the simultaneous dumping of the two bodies yields a balancing of the forces applied to the chassis by both the dump body and the load when the hoists are actuated. This overall stability of the trailer 10 is such that loads may be safely dumped even on inclined and unfirm terrain and/or while the trailer is in motion.

More specifically, because the dump bodies 12 and 13 are oppositely pivoted relative to the chassis 14, substantially all of the lateral forces imparted to the chassis are cancelled. Moreover, because dumping is effected over opposite sides of the chassis, horizontal force and stress components are eliminated and there is no longitudinal or horizontal shift in the center of gravity of the trailer during any stage of the dumping operation. Consequently, the weight of the dumping trailer 10 and the load carried thereby is evenly balanced between the front and rear wheels and between the oppositely disposed side wheels during dumping operations.

The significance of these characteristics of the dumping trailer 10 will be appreciated when it is realized that in conventional rear dumping trailer arrangements the combined center of gravity and load of the trailer shifts toward the rear wheels when the trailer is advanced to its rearward dumping position. The weight unbalance that results due to this shifting of the center of gravity can result in the entire combined load weight being placed over and beyond the rear wheels so as to overturn the front of the truck, with possible injury to both the vehicle and driver.

Other advantages steming from the construction as previously described relate to the low loading height and the low dumping height. In this connection, because of the large surface area and relatively low side wall depth offered by the dump bodies 12 and 13, the loading of the dumping trailer 10 can be rapidly effected and this loading can be accomplished with material handling equipment which might not otherwise be usable with the conventional, deep side wall dumping trailer constructions.

Because the center of rotation of each of the dump bodies and the load carried thereby is located inwardly from the edge of the dumping side walls, it is not necessary to advance the bodies to too great a height to insure that the proper dumping angle is achieved. In this connection, a portion of the body and the load extends beyond the hinge members 16 and is moved downwardly during a dumping operation so as to counteract and compensate for the upward movement of the center of gravity that tends to be caused by the remainder of the body and load.

Because the previous description is merely illustrative of one preferred embodiment of the invention, it will be understood that modifications of this embodiment might be devised by those skilled in the art without departing from the invention, various features of which are set forth in the accompanying claim.

What is claimed is:

A dump trailer for receiving, transporting and dumping material loads; which dump trailer comprises an elongated vehicular chassis having forward and rearward ends; truck wheels mounted on at least said rearward end of said chassis; coupling means secured to said forward end of said chassis for joining said chassis to a wheeled truck tractor; a pair of elongated load carrying dump bodies; each of said dump bodies having a unitary scow-shaped configuration defined by a substantially flat and normally horizontal bottom wall, short merging side, front and rear walls, and a dumping wall that is angularly merged with said front, rear and bottom walls; said dump bodies being mounted on said chassis so that said chassis provides the support for said dump bodies when said dump bodies are in a normal material receiving and material transporting position; hinge means mounted on said chassis below the dump body supporting plane thereof for joining said dump bodies to said chassis in longitudinal alignment; one of said dump bodies being hingedly joined to said chassis so that the angularly disposed dumping side wall thereof projects beyond a first side of said chassis; the second of the dump bodies being hingedly joined to said chassis so that the angularly disposed dumping side wall thereof projects beyond the opposite side of said chassis; said dump body defining side, front, rear and dumping walls being joined so that the outermost extremities of said adjacent side and dumping walls of the longitudinally aligned dump bodies are co-planar and are substantially aligned with the outermost wheels on said chassis when said bodies are in a normal position whereby the dump trailer formed thereby has a substantially uniform width dimension throughout; said hinge means being secured to said dump bodies and said chassis so that said dump bodies are simultaneously rotatable relative to said chassis and about an axis of rotation that lies substantially adjacent the line of merger of said dumping side wall with the bottom wall of each of said dump bodies and which is parallel to the central axis of said chassis; hydraulic piston-cylinder means secured to said dump bodies and said chassis beneath the dump body supporting plane of said chassis for effecting the simultaneous pivoting of said dump bodies in opposite directions about the axes of rotation defined by said hinge means and into force complementing angular load dumping positions on opposite sides of said chassis; said piston cylinder means for one of said dump bodies being located adjacent one side of said chassis and opposite to that beyond which the dumping side wall of said dump body extends; said piston cylinder means for the other of said dump bodies being located adjacent the other side of said chassis and opposite that beyond which the dumping side wall of said dump body extends; said dumping wall of each of said dump bodies being disposed and secured to the other wall members of said dump body at an obtuse angle such that the outer extremity of said dumping wall projects beyond said wheels of said chassis when said dump body is in a load dumping position.

References Cited

UNITED STATES PATENTS

| | | | |
|---|---|---|---|
| 1,909,969 | 5/1933 | Kuchar | 298—17.6 |
| 2,611,641 | 9/1952 | Stockwell | 298—18 |
| 3,152,837 | 10/1964 | Margala | 298—22 X |
| 3,195,956 | 7/1965 | Kou | 298—22 |

FOREIGN PATENTS

| | | |
|---|---|---|
| 965,816 | 2/1950 | France. |
| 187,070 | 10/1922 | Great Britain. |
| 455,000 | 2/1950 | Italy. |

BENJAMIN HERSH, *Primary Examiner.*

MILTON BUCHLER, *Examiner.*

R. J. JOHNSON, *Assistant Examiner.*